United States Patent [19]

Schmerling

[11] 3,883,590

[45] May 13, 1975

[54] PREPARATION OF N-ALKYLARYLCARBOXAMIDES

[75] Inventor: Louis Schmerling, Riverside, Ill.

[73] Assignee: Universal Oil Products Company, Des Plaines, Ill.

[22] Filed: Apr. 2, 1973

[21] Appl. No.: 347,588

Related U.S. Application Data

[63] Continuation-in-part of Ser. No. 148,916, June 1, 1971, abandoned, which is a continuation-in-part of Ser. No. 853,963, Aug. 28, 1969, Pat. No. 3,634,510.

[52] U.S. Cl. ............................................. 260/558 R
[51] Int. Cl. ......................................... C07c 103/34
[58] Field of Search ............ 260/558, 557, 559, 562

[56] References Cited
UNITED STATES PATENTS

| | | | |
|---|---|---|---|
| 2,415,699 | 2/1947 | Lieber | 260/51.5 |
| 2,601,387 | 6/1952 | Gresham et al. | 260/561 |
| 2,628,217 | 2/1953 | Magat | 260/561 |
| 3,338,967 | 8/1967 | Potts et al. | 260/561 |
| 3,381,034 | 4/1968 | Greene | 260/558 |
| 3,634,510 | 1/1972 | Schmerling | 260/561 |

OTHER PUBLICATIONS

Cannon et al., J. Org. Chem. Vol. 18, p. 516–520 (1953).

*Primary Examiner*—Harry I. Moatz
*Attorney, Agent, or Firm*—James R. Hoatson, Jr.; Raymond H. Nelson; William H. Page, II

[57] ABSTRACT

Carboxamides, and particularly carboxamides containing alkyl substituents on the nitrogen atom, are prepared by condensing an aryl or arylalkyl cyanide with an alkyl halide in the presence of certain metal halides and water. In this way, N-t-butylbenzamide is prepared from benzonitrile and t-butyl chloride.

10 Claims, No Drawings

PREPARATION OF N-ALKYLARYLCARBOXAMIDES

CROSS-REFERENCE TO RELATED APPLICATIONS

This application is a continuation-in-part of my co-pending application Ser. No. 148,916 filed June 1, 1971, now abandoned, which was a continuation-in-part of my co-pending application Ser. No. 853,963 filed Aug. 28, 1969 and now U.S. Pat. No. 3,634,510.

BACKGROUND OF THE INVENTION

Heretofore the prior art has shown reactions in which alkylarylcarboxamides have been prepared in a two-step process, the first step being the condensation reaction in the presence of anhydrous catalysts of the Friedel-Crafts type followed by hydrolysis of the product to form the desired alkylarylcarboxamides. This two-step process was believed necessary in view of the fact that it was believed that catalysts which were used for the alkylation reaction would have to be used in an anhydrous condition. This belief was fostered by the knowledge that anhydrous Lewis type acids catalyze the reaction of nitriles with alkylating agents and the feeling that if the catalyst was in aqueous form, it would be inoperative for the purpose intended just as it is inoperable for other reactions, e.g. benzene alkylation. Other prior art references have also shown that nitriles may be hydrolyzed to amides by heating with an aqueous solution of a Lewis-acid type catalyst such as cupric chloride. However, this hydrolysis was effected in a second step subsequent to the preparation of the alkylated nitrile. Yet another prior art reference taught a process for preparing amides by treating a nitrile with an alkyl halide in the presence of strong acid catalysts such as sulfuric acid.

In contradistinction to the prior art, it will be hereinafter shown in greater detail that I have unexpectedly discovered that an alkylarylcarboxamide containing a substituent on the nitrogen atom may be prepared in a one-step process by reacting an aryl or arylalkyl cyanide with an alkyl or cycloalkyl halide in the presence of water and a halide, preferably a chloride, of certain metals. This discovery was unexpected in view of the fact that, as hereinbefore set forth, a person skilled in the art would be led away from the proposition that an aqueous solution of a Lewis-type acid would be active in a catalytic manner in a one-step alkylation and hydrolysis reaction to form the desired compounds of the present invention.

This invention relates to a method for preparing carboxamides, and particularly to a method for preparing aryl or arylalkyl carboxamides which contain substituents on the nitrogen atom in a one-step process.

The compounds which are prepared according to the process of the present invention and which comprise N-alkylarylcarboxamides, the term "alkyl" as used in the present specification and appended claims being defined as including both straight chain or branched chain alkyl as well as cycloalkyl substituents, will find use in the chemical industry as reactants, solvents or peroxide stabilizers; in organic syntheses; as general solvents; lacquers; explosives; soldering fluxes; hygrosopic agents, wetting agents, penetrating agents; etc. The compounds are prepared as hereinbefore set forth, by condensing or reacting an aryl or arylalkyl cyanide with an alkyl halide in the presence of water and certain catalytic compositions hereinafter set forth in greater detail at elevated temperatures. Also, as used in this specification and appended claims, the term "arylcarboxamide" is generic to either or both "arylcarboxamide" and "arylalkylcarboxamide."

It is therefore an object of this invention to provide a process for preparing certain carboxamides.

A further object of this invention is to provide a process for preparing N-alkylarylcarboxamides containing alkyl or cycloalkyl substituents on the nitrogen atom by condensing certain nitriles (i.e., aryl or arylalkyl cyanides) with alkyl halides in the presence of certain catalytic compositions of matter.

In one aspect an embodiment of this invention resides in a one-step process for the preparation of an N-alkylarylcarboxamide or an N-alkylarylalkylcarboxamide which comprises reacting an aryl or an arylalkyl cyanide with an alkyl or cycloalkyl halide in the presence of water and a chloride of a metal selected from the group consisting of copper, iron, aluminum and zinc at a temperature in the range of from about 50° to about 250° C. and at a pressure in the range of from atmospheric to about 100 atmospheres, and recovering the resultant N-alkylarylcarboxamide.

A specific embodiment of this invention is found in a one-step process for the preparation of N-alkylarylcarboxamides which comprises reacting benzonitrile with t-butyl chloride in the presence of water and cupric chloride at a temperature in the range of from 50° to about 250° C. and at a pressure in the range of from atmospheric to about 100 atmospheres, and recovering the resultant N-t-butylbenzamide.

Other objects and embodiments will be found in the following further detailed description of the present invention.

As hereinbefore set forth it has now been unexpectedly discovered that substituted carboxamides, and particularly alkylarylcarboxamides containing substituents positioned on the nitrogen atoms, may be prepared in a one-step process. Specifically speaking, the invention concerns a one-step N-alkylation process as opposed to the prior art in which the N-alkylation of a nitrile has heretofore been accomplished in separate and distinct steps. The obtention of the desired products was unexpected in view of the fact that it has heretofore been believed that when a Lewis acid such as aluminum chloride is treated with more than a molecular amount of water, it loses its activity as an alkylation catalyst. Therefore, the use of an aqueous solution of this type of catalyst such as aluminum chloride, copper chloride, etc. as a catalyst for the N-alkylation of aryl or arylalkyl cyanides was totally unexpected. This, of course, differs from the prior art in which a two-step process for the preparation of carboxamides is effected by first alkylating and then hydrolyzing the resultant product to form the desired product, the latter or second step of the process utilizing a catalyst such as an aqueous copper halide solution which is not utilized in the first step of the process.

The process of the present invention is effected by reacting or condensing a nitrile with an alkyl halide, the term "alkyl" being hereinbefore defined, said process being effected in the presence of water and certain halide salts of metals hereinafter set forth in greater detail. The nitriles which are utilized as one of the starting materials of the present process will comprise an aryl cyanide or an arylalkyl cyanide. Specific examples of these nitriles which are utilized as one of the starting materials of the present process will include benzonitrile, 1-naphthonitrile, 2-naphthonitrile, 1-anthronitrile, 2-anthronitrile, 1-phenanthronitrile, 2-phenanthronitrile, 1-pyrrolnitrile, 2-pyrrolnitrile, 1-chrysonitrile, 2-chrysonitrile, phenylacetonitrile, phenylpropionitrile, phenylbutyronitrile, phenylvaleronitrile, o-tolunitrile, m-tolunitrile, p-tolunitrile, o-ethylbenzonitrile, m-ethylbenzonitrile, p-ethylbenzonitrile, phthalonitrile, isophthalonitrile, terephthalonitrile, o-tolylacetonitrile, m-tolylacetonitrile, p-tolylacetonitrile, o-tolylpropionitrile, m-tolylpropionitrile, p-tolylpropionitrile, o-tolylbutyronitrile, m-tolylbutyronitrile, p-tolylbutyronitrile, trimesonitrile, 1-naphthylacetonitrile, 2-naphthylacetonitrile, 1-naphthylpropionitrile, 2-naphthylpropionitrile, 1-naphthylbutyronitrile, 2-naphthylbutyronitrile, etc. It is to be understood that the aforementioned aryl or arylalkyl cyanides are only representative of the class of compounds which may be used, and that the present invention is not necessarily limited thereto.

The aforementioned nitriles are reacted or condensed with an alkyl halide and preferably a chloride, it is also being contemplated that other halides such as bromides, iodides and fluorides may be used although not necessarily with equivalent results. Representative examples of these alkyl halides which may be used include the open chain alkyl halides containing from one to about 20 carbon atoms or more including methyl chloride, ethyl chloride, n-propyl chloride, isopropyl chloride, n-butyl chloride, sec-butyl chloride, t-butyl chloride, n-pentyl chloride, sec-pentyl chloride, isopentyl chloride, n-hexyl chloride, 2-methylpentyl chloride, 3-methylpentyl chloride, n-heptyl chloride, 2-methylhexyl chloride, 3-methylhexyl chloride, n-octyl chloride, 2-methylheptyl chloride, 3-methylheptyl chloride, 4-methylheptyl chloride, the corresponding isomeric nonyl, decyl, undecyl, dodecyl, tridecyl, tetradecyl, pentadecyl, hexadecyl, heptadecyl, octadecyl, nonadecyl, eicosyl chlorides; cycloalkyl halides such as cyclopentyl chloride, cyclohexyl chloride, cycloheptyl chloride, 1-, 2-, or 3-methylcyclopentyl chloride, 1-, 2-, 3-, or 4-methylcyclohexyl chloride, etc.; the corresponding bromides, iodides and fluorides. Of the aforementioned alkyl chlorides, the preferred compounds will comprise those alkyl chlorides containing a tertiary carbon atom such as t-butyl chloride, etc., inasmuch as the tertiary alkyl chlorides are more reactive than the secondary alkyl chlorides such as sec-pentyl chloride, said secondary alkyl chlorides, in turn, being more reactive than the primary alkyl chlorides such as methyl chloride or ethyl chloride.

The reaction or condensation of the nitrile and the alkyl halide is effected at elevated temperatures ranging from about 50° to about 250° C. or more and preferably in a range of from about 100° to about 150° C. In addition, the reaction may also be effected at a pressure ranging from atmospheric up to about 100 atmospheres or more, said pressure being due to pressure of the reactants or being effected by the introduction of an inert gas such as nitrogen into the reaction zone. In the preferred embodiment of this invention sufficient pressure is utilized to maintain the reactants in the liquid phase. It is also contemplated within the scope of this invention that substantially inert organic solvents may be employed including straight-chain paraffins such as n-pentane, n-hexane, n-heptane, etc., branched-chain paraffins such as isopentane, 2-methylhexane; cycloparaffins such as cyclopentane, cyclohexane, methylcyclohexane, etc.; lower molecular weight alcohols such as methyl alcohol, ethyl alcohol, n-propyl alcohol, isopropyl alcohol, etc.; aromatic hydrocarbons such as benzene, toluene, the xylenes, etc.

The reaction is effected in the presence of certain halide salts of metals, a criterion being that the oxide of the metals constitute weak bases. The term "weak bases" as utilized in the specification denotes those bases formed from metals other than the alkali and alkaline earth metals. Since the reactions are carried out in the presence of water, these catalysts include hydrated salts which may not be catalysts for Friedel-Crafts reactions. Representative examples of these catalysts which may be used include anhydrous and hydrated forms of the salts such as cuprous chloride, cupric chloride, cupric chloride dihydrate, ferrous chloride, ferric chloride, ferrous chloride tetrahydrate, ferric chloride hexahydrate, aluminum chloride hexahydrate, zinc chloride, etc. In addition, the reaction is effected in the presence of water, said water being present in the reaction mixture in an amount ranging from about 2% to about 50% or more by weight of the nitrile.

The one-step process of this invention for preparing N-alkylarylcarboxamides may be effected in any suitable manner and may comprise either a batch or continuous type operation. For example, when a batch type operation is to be used, a quantity of the starting materials comprising the aryl or arylalkyl cyanide, and alkyl halide, the halide of a metal and water are placed in an appropriate apparatus along with, if so desired, a solvent of the type hereinbefore set forth. A specific type of apparatus which may be used in this type of alkylation, especially when the one-step N-alkylation is to be effected, comprises a rotating or mixing autoclave. The autoclave is sealed and an inert gas such as nitrogen may be pressed in until the initial operating pressure has been reached. Following this, the autoclave is then heated to the desired reaction temperature and maintained thereat for a predetermined residence time which may range from 0.5 up to about 10 hours or more in duration. Upon completion of the reaction time, heating is discontinued and the apparatus and contents thereof are allowed to return to room temperature. The excess pressure, if any, is discharged and the reaction mixture is recovered from the autoclave. Following this, the mixture is then separated from the catalyst by conventional means such as filtration, distillation, water-wash, etc., and thereafter subjected to conventional purification and separation means which may include washing, extraction, drying, fractional distillation under reduced pressure, fractional crystallization, etc., whereby the desired product comprising the N-alkylarylcarboxamide is separated and recovered.

It is also contemplated within the scope of this invention that the one-step process for preparing N-alkylarylcarboxamides may be effected in a continuous manner of operation. When such a type of operation is used, the aryl or arylalkyl cyanide and the alkyl halide comprising the starting materials are continuously charged to a reaction vessel which is maintained at the proper operating conditions of temperature and pressure, said reaction vessel also containing the particular catalyst or mixture of metal halide catalysts which have been selected either as such or in aqueous solution. The water (and the solvent, if one is to be employed) is also continuously charged to the reactor. Alternatively speaking, the reactants may be admixed prior to entry into said reactor and charged thereto in a single stream, or the water and solvent may be admixed with one or both of the reactants of the metal salt prior to entry into said reaction zone. After completion of the predetermined residence time has been effected, the reactor effluent is continuously withdrawn and subjected to separation steps whereby any unreacted starting materials are removed from the desired product comprising the N-alkylarylcarboxamide, said unreacted starting materials being recycled to the reaction zone to form a portion of the feed stock, while the desired product is recovered for storage. The aqueous solution of the catalyst may also be fed over the fixed bed of an inert substance such as alumina or silica pills, while the other reactants are simultaneously fed from another line or lines.

Some specific examples of N-alkylarylcarboxamides which may be prepared according to the process of this invention will include N-t-butylbenzamide, N-t-butylphenylacetamide, N-t-butylphenylpropionamide, N-t-butylnaphthamide, N-t-butylnaphthylacetamide, N-t-butylnaphthylpropionamide, N-sec-butylbenzamide, N-sec-butylphenylacetamide, N-sec-butylphenylpropionamide, N-sec-butylnaphthamide, N-sec-butylnaphthylacetamide, N-sec-butylnaphthylpropionamide, N-1-methylbutylbenzamide, N-1-methylcyclohexylbenzamide, N-1-methylcyclohexylphenylacetamide, N-1-methylcyclohexylphenylpropionamide, N-1-methylcyclohexylnaphthamide, N-1-methylcyclohexylnaphthylacetamide, N-1-methylcyclohexylnaphthylpropionamide, N-t-butyl-o-toluamide, N-1-methylbutyl-o-toluamide, N-1-methylcyclohexyl-o-toluamide, N-t-butyl-p-ethylbenzamide, N-1-methylbutyl-p-ethylbenzamide, N-1-methylcyclohexyl-p-ethylbenzamide, N-t-butylphthalamide, N-sec-butylphthalamide, N-1-methylcyclohexylphthalamide, etc. It is to be understood that the aforementioned N-alkylarylcarboxamides are only representative of the class of compounds which may be prepared when utilizing the process of the present invention, and that said invention is not necessarily limited thereto.

The following examples are given to illustrate the process of the present invention which, however, are not intended to limit the generally broad scope of the present invention in strict accordance therewith.

EXAMPLE I

In this example a solution of 55 grams (0.59 mole) of t-butyl chloride and 87 grams (0.84 mole) of benzonitrile was placed in a reaction vessel along with a solution of 5 grams of cupric chloride in 18 grams of water. The solution was heated to a temperature of 130° C. and maintained in a range of from 130° to 140° C. for a period of 4 hours. At the end of this time, heating was discontinued and the reaction product which was a mixture of a yellowish crystalline mass and a dark amber liquid was recovered. The crystals were separated by filtration and recrystallized from aqueous methyl alcohol. The crystals obtained from the recrystallization had a melting point of 133°-134° C., said crystals comprising N-t-butylbenzamide. The crystals were analyzed for carbon-hydrogen with the following results:

Calculated for: $C_6H_5CONHC_4H_9$: C, 74.54; H, 8.53
Found: C, 74.33; H, 8.54

EXAMPLE II

A mixture consisting of 45 grams (0.27 mole) of phenylacetonitrile, 41 grams (0.44 mole) of t-butyl chloride, 8 grams of water and 4 grams of a catalyst comprising cupric chloride was heated at a temperature of 130° to 140° C. for a period of 4 hours. At the end of the reaction time, heating was discontinued and the product comprising a mixture of a crystalline mass and a dark amber oil was recovered. The crystals were filtered to separate them from the oil and recrystallized from methyl alcohol. The recrystallized crystals comprising N-t-butylphenylacetamide had a melting point of 109°-110° C. In addition these crystals were subjected to carbon-hydrogen analysis with the following results:

Calculated for: $C_6H_5CH_2CONHC_4H_9$: C, 75.34; H, 8.96
Found: C, 75.18; H, 8.71

EXAMPLE III

A mixture comprising 91 grams (0.70 mole) of 1-methylcyclohexyl chloride, 98 grams (0.95 mole) of benzonitrile along with 20 grams of water and 5 grams of a catalyst comprising cuprous chloride is placed in the glass liner of a rotating autoclave. After sealing the liner into the autoclave, nitrogen is pressured in until an initial operating pressure of 30 atmospheres is reached. The autoclave is then heated to a temperature of 140° C. and maintained thereat for a period of 8 hours. At the end of this time, heating is discontinued, the autoclave is allowed to return to room temperature and the excess pressure is discharged. The autoclave is then opened and the reaction mixture is recovered therefrom. The mixture is separated from the catalyst and the crystals which form are separated from the liquid portion of the product. Recrystallization of the crystalline mass will yield a desired product comprising N-1-methylcyclohexylbenzamide.

EXAMPLE IV

In this example 153 grams (1.0 mole) of 1-naphthonitrile, 55.5 grams (0.6 mole) of t-butyl chloride, 20 grams of water and 5 grams of a catalyst comprising cupric chloride are placed in the glass liner of a rotating autoclave which is thereafter sealed into said autoclave and nitrogen is pressured in until an initial operation pressure of 30 atmospheres is reached. The autoclave and contents thereof are then heated to a temperature of 150° C. and maintained thereat for a period of 8 hours. Upon completion of the aforementioned 8 hours, heating is discontinued, the autoclave is allowed to return to room temperature and the excess pressure is discharged. The autoclave is opened and the reaction product is recovered therefrom. After separation of the crystalline mass from the liquid portion of the product, the mass is recrystallized from an aqueous methyl alcohol solution, the crystals obtained from the recrystallization comprising N-t-butyl-1-naphthamide.

EXAMPLE V

A mixture consisting of 157.5 grams (0.9 mole) of 3-phenylpropionitrile, 53 grams (0.5 mole) of isopropyl chloride, 20 grams of water and 4 grams of a catalyst comprising aluminum chloride is charged to the glass liner of a rotating autoclave which is thereafter sealed into said autoclave. After pressuring the autoclave with nitrogen until an initial operating pressure of 30 atmospheres is reached, heating is applied until a temperature of 130° C. is reached. The reaction proceeds for a period of 8 hours, while maintaining the autoclave at this temperature. Following this, heating is discontinued, the autoclave is allowed to return to room temperature and the excess pressure is discharged. The autoclave is opened and the reaction mixture is recovered therefrom. After separation from the catalyst, the reaction mixture is filtered to separate the crystalline mass from the liquid portion of the product. Distillation of this mass will yield the desired product which comprises N-isopropyl-3-phenylpropionamide.

I claim as my invention:

1. A one-step process for the preparation of an N-alkylarylcarboxamide or an N-alkylarylalkylcarboxamide which comprises reacting an aryl or an arylalkyl cyanide with an alkyl or cycloalkyl halide in the presence of water and a chloride of a metal selected from the group consisting of copper, iron, aluminum and zinc at a temperature in the range of from about 50° to about 250° C. and at a pressure in the range of from atmospheric to about 100 atmospheres, and recovering the resultant N-alkylarylcarboxamide.

2. The process as set forth in claim 1 in which said alkyl halide is a t-alkyl chloride.

3. The process as set forth in claim 1 in which said chloride of a metal is cupric chloride.

4. The process as set forth in claim 1 in which said chloride of a metal is cuprous chloride.

5. The process as set forth in claim 1 in which said chloride of a metal is aluminum chloride.

6. The process as set forth in claim 1 in which said cyanide is benzonitrile, said alkyl halide is t-butyl chloride and said N-alkylarylcarboxamide is N-t-butylbenzamide.

7. The process as set forth in claim 1 in which said cyanide is phenylacetonitrile, said alkyl halide is t-butyl chloride and said N-alkylarylcarboxamide is N-t-butylphenylacetamide.

8. The process as set forth in claim 1 in which said cyanide is benzonitrile, said cycloalkyl halide is 1-methylcyclohexyl chloride and said N-alkylarylcarboxamide is N-1-methylcyclohexylbenzamide.

9. The process as set forth in claim 1 in which said cyanide is 1-naphthonitrile, said alkyl halide is t-butyl chloride and said N-alkylarylcarboxamide is N-t-butyl-1-naphthamide.

10. The process as set forth in claim 1 in which said cyanide is 3-phenylpropionitrile, said alkyl halide is isopropyl chloride and said N-alkylarylcarboxamide is N-isopropyl-3-phenylpropionamide.

* * * * *